United States Patent
Blomgren, Sr. et al.

[15] 3,670,606
[45] June 20, 1972

[54] METHOD AND APPARATUS FOR COOLING THE WORKPIECE AND/OR THE CUTTING TOOLS OF A MACHINING APPARATUS

[72] Inventors: Oscar C. Blomgren, Sr.; Oscar C. Blomgren, Jr., both of Lake Bluff, Ill.

[73] Assignee: Inter-Probe, Inc., Chicago, Ill.

[22] Filed: Oct. 12, 1970

[21] Appl. No.: 79,751

[52] U.S. Cl. .............................. 82/1 C, 82/DIG. 1, 90/11 R, 408/56, 83/171
[51] Int. Cl. ........................................................ B23b 1/00
[58] Field of Search .................... 82/DIG. 1, 1 C; 90/11 R; 408/56; 219/69 G; 83/171

[56] References Cited

UNITED STATES PATENTS

| 3,587,367 | 6/1971 | Dotson | 90/11 R |
| 3,303,731 | 2/1967 | Zawistowski | 82/DIG. 1 |
| 3,137,184 | 6/1964 | Meyers | 82/DIG. 1 |

Primary Examiner—Leonidas Vlachos
Attorney—Kinzer, Dorn and Zickert

[57] ABSTRACT

A method and apparatus for dissipating heat generated during the machining and processing of metals or other materials which includes directing toward the workpiece and/or cutting tool a needle-like or sharp tooth-shaped probe that is connected to a high voltage direct current potential, and electrically insulating the workpiece and cutting tool from the machine.

7 Claims, 3 Drawing Figures

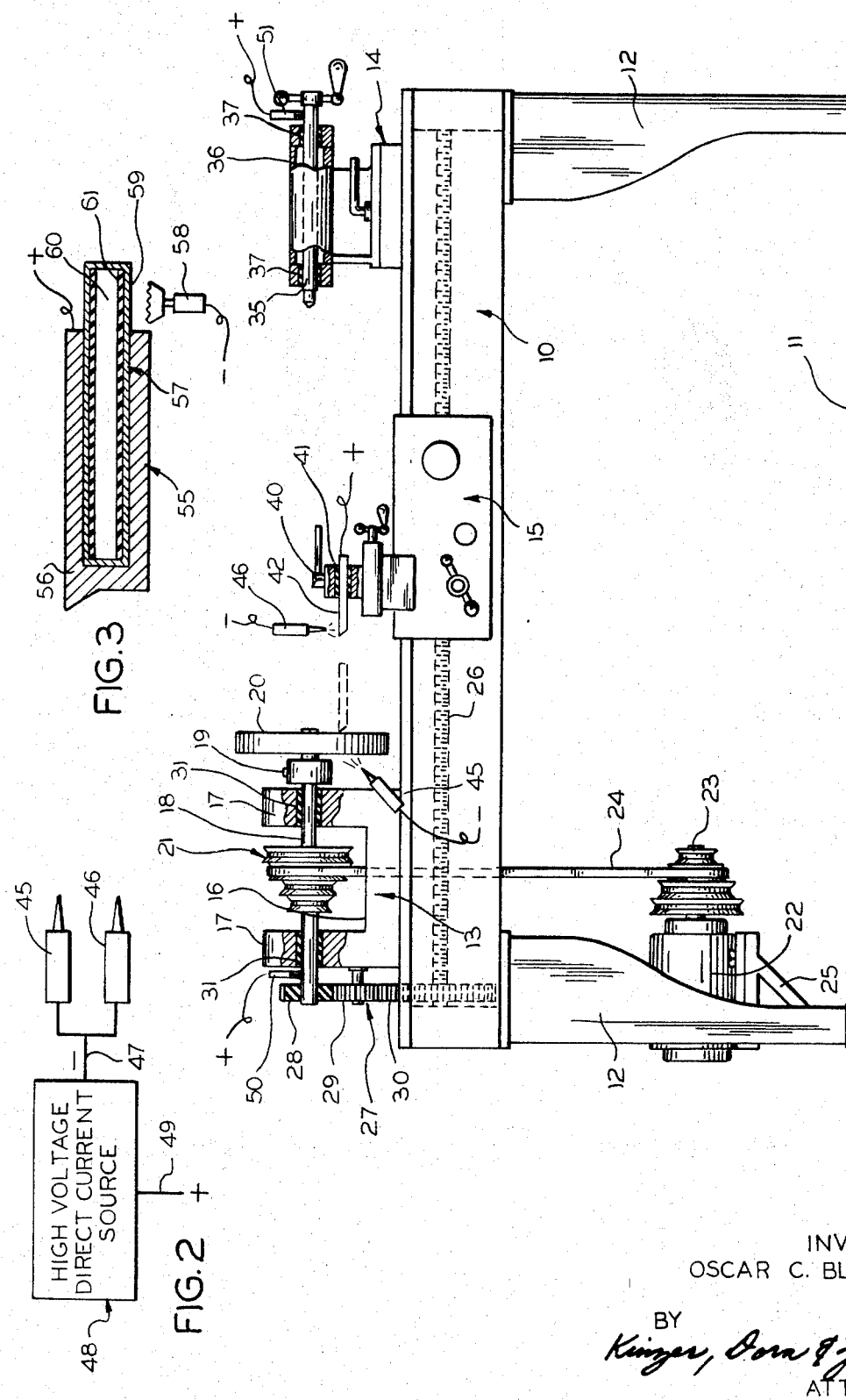

METHOD AND APPARATUS FOR COOLING THE WORKPIECE AND/OR THE CUTTING TOOLS OF A MACHINING APPARATUS

This invention relates in general to a method and apparatus for cooling a workpiece and/or cutting tool arranged together in material cutting relationship, and more particularly to a method and apparatus for dissipating heat generated in material cutting operations, and still more particularly to a method and apparatus for applying an electrostatic discharge to a material cutting operation.

Heretofore, it has been usual that cooling fluids, both air and liquid, have been employed for dissipating heat generated in the machining of materials, such as in metal cutting operations. Cooling is necessary as hot machined pieces discolor and receive surface blemishes because of heat. Also cooling increases tool life. Such machining operations are usually performed by lathes, milling machines, planers and the like. Cooling by air, such as by directing refrigerated air to the cutting operation, is sometimes objectionable since it requires extensive auxiliary equipment to collect cuttings or chips and prevent them from becoming entangled in the cutting operation. Moreover, considerable equipment is necessary to produce the proper refrigerated air. Cooling by a liquid coolant requires auxiliary equipment for pumping liquid through a nozzle that directs a stream of liquid coolant onto the workpiece and/or tool which sometimes obscures the view of the operator and interferes with the control of the cutting operation. Moreover, it becomes necessary to separate the liquid coolant from the cuttings or chips in order to again use the coolant, and complete separation is not usually possible wherein the cuttings or chips end up with a film of coolant thereon, thereby resulting in a loss of coolant.

The present invention obviates the difficulties heretofore known in the cooling of material cutting operations, in that if effects cooling of the workpiece and/or the cutting tool with a minimum amount of auxiliary equipment which enjoys a long life with little maintenance, and without requiring more than a receptacle into which cuttings may drop by gravity. The cooling method applies in the machining of both electrically conductive and nonconductive materials. The invention includes constructing the cutting machine so that the workpiece and cutting tool are electrically insulated from the supporting elements of the machine and grounded, and the mounting of one or more needle-like or sharp tooth-shaped probes on the machine so that the probes are directed toward the workpiece and/or cutting tool in the area of engagement between the workpiece and tool. The probes are negatively or positively charged with a high voltage direct current potential and the terminal ends of the probes are spaced from the workpiece and/or the cutting tool a distance slightly greater than that which would normally cause arcing. The level of potential chosen is such that it will handle the cooling needed and desired. For example, it would be usual that a high voltage low current D.C. potential of about 10,000 to 250,000 volts be employed.

Accordingly, it is an object of the present invention to provide a new and improved apparatus and method for dissipating heat generated in a material cutting operation.

Another object of this invention is in the provision of constructing a machining apparatus wherein the workpiece and the cutting tool are electrically insulated from their supporting elements so that an electrostatic discharge can be applied to the workpiece and/or tool in the area of the cutting operation to dissipate the heat generated.

Other objects, features and advantages of the invention will be apparent from the following detailed disclosure, taken in conjunction with the accompanying sheet of drawing, wherein like reference numerals refer to like parts, in which:

FIG. 1 is a front elevational, partially diagrammatic view of a lathe and the apparatus of the invention, showing some parts broken away and other parts in section for purposes of clarity;

FIG. 2 is a block diagram showing the application of a high voltage D.C. potential to needle-like or sharp tooth-shaped probes used in the apparatus of the invention; and FIG. 3 is a longitudinal sectional view taken through a cutting tool having a heat pipe to remove heat from the cutting tip electrostatically through the heat pipe.

While the present invention is applicable to any material cutting apparatus for the purpose of dissipating heat generated in the cutting operation, the apparatus and method will be shown and described relative to a lathe. It should be appreciated the method and apparatus of the invention, while primarily applicable to metal cutting operations, is useful for the machining of other materials as well, both electrically conductive and nonconductive. The method and apparatus of the invention may be equally applied to milling machines, planers, grinders, drilling machines and the like. The method generally includes the steps of electrically insulating the workpiece and the cutting tool from their supporting elements, grounding of the workpiece and cutting tool, and applying an electrostatic cooling spray to the area of the cutting operation. The electrostatic cooling spray is applied by directing needle-like and/or sharp tooth-shaped probes toward the workpiece and/or the cutting tool, and then feeding a high voltage direct current potential to the probes of a magnitude sufficient to effect cooling. The terminal ends of the probes are spaced from the workpiece or the cutting tool a distance slightly greater than that which would support arcing between the probe and the workpiece or tool. Any number of probes may be employed at the same time, this depending upon the cooling capacity needed. Further, the level of the potential is determined in part by the cooling capacity needed, although it has been generally found that a range of 10,000 to 250,000 volts will suffice for a wide range of situations. The potential has a very low current, in the milliampere range. The negative or positive side of the potential is connected to the probes, while the other side of the potential may be connected to the workpiece and/or the tool, although such is not necessary, as long as the workpiece and/or tool are grounded. Preferable the probes are negatively charged, as it has been found that the negative field is more stable than the positive field, and will produce the most effective cooling.

As already mentioned, the present invention is illustrated in connection with a lathe, and as seen in FIG. 1, the lathe generally includes a bed 10 supported above the floor 11 by legs 12. A headstock 13 is mounted at one end of the bed in fixed relation thereto, while a tailstock 14 is mounted at the other end of the bed and adjustable therealong to accommodate workpieces of varying sizes. Between the headstock and tailstock, a cross-slide 15 for holding the cutting tool is movably mounted to move along the bed in preparation for and during the cutting operation.

The headstock includes a shaft or spindle support 16 having upstanding arms 17 through which a spindle or shaft 18 extends and is bearingly supported for rotation. At the end of the shaft 18 adjacent the center of the bed, a chuck 19 is provided for selectively gripping a workpiece such as workpiece 20. A multi-speed pulley 21 is carried on the shaft 18 between the arm 17 and driven by a motor 22 through a multi-speed drive pulley 23 and a belt 24. The motor 22 is mounted on a support 25 carried by the legs 12. It should be appreciated that the spindle or workpiece shaft 18 can be driven through any other type of driving arrangement.

The cross-slide 15 is driven in the usual manner by an elongated threaded rod 26 which is rotatably mounted in the bed 10 and which engages a suitable nut carried by the cross-slide. A gearing arrangement between the workpiece shaft 18 and the threaded rod 26, generally indicated by the numeral 27 delivers power to the threaded shaft in proportion to the speed of the spindle 18. The gear arrangement includes a drive gear 28 carried on the end of the spindle 18, an intermediate idler gear 29, and a driven gear 30 carried on the threaded rod 26. It should be recognized the gearing arrangement could be adjustable to vary the speed ratio between the spindle and rod.

The workpiece 20 carried by the chuck 19 is electrically insulated from the supporting elements of the chuck and spindle 18 by insulating sleeves 31 in the arms 17 and the construction of gear 28 of electrically insulating material. It will be appreciated that the insulating sleeves 31 will be associated with the bearings for the workpiece shaft 18 so that the shaft is electrically insulated from the shaft support 16. While not shown, it should be appreciated that the chuck 19 could otherwise include workpiece gripping members insulated from the chuck body and accordingly permit the workpiece to be insulated from the machine.

In the event of a long workpiece that must be supported also by the tailstock, the tailstock support pin 35 is electrically insulated from the bracket 36 of the tailstock by sleeves 37 made of electrically insulating material. Accordingly, should the tailstock support pin 35 engage the workpiece, the workpiece will be electrically insulated from the supporting elements of the support pin.

Carried on the cross-slide 15 is a tool holder 40 which includes an electrically insulating sleeve 41 within which a cutting tool 42 is received, thereby electrically insulating the cutting tool 42 from its supporting elements.

In order to dissipate the heat generated during the metal cutting operation in accordance with the invention, first and second needle-like and/or sharp tooth-shaped probes 45 and 46 are shown in spaced relation to the workpiece and the cutting tool, with the terminal ends of the probes being directed toward the cutting area. In particular, the probe 45 is arranged to direct its discharge toward the back side of the workpiece 20 in the area of the cutting operation, while the probe 46 is directed to the cutting end of the tool 42. As seen in FIG. 2, the probes are connected to the negative side 47 of a high voltage direct current source 48, this being preferred as above mentioned although the probes could be connected to the positive side of the source 48. The positive side 49 may be connected to the workpiece 20 and/or the cutting tool 42 if desired, but such is not necessary if all are connected to ground. Brush 50 serves to ground the shaft 18 or connect it to the positive side 49 of source 48, while brush 51 serves the same purpose for the tailstock support pin 35. The cutting tool may also be connected to ground or the positive side of source 48. The terminal ends of the needle-like or sharp tooth-shaped probes 45 and 46 are spaced a distance from the surfaces to be cooled slightly greater than that which would support arcing between the probes and the surfaces. While only two probes are illustrated, it should be appreciated that any number may be employed depending upon the cooling capacity and area to be cooled. The high voltage D.C. source is preferably of a variable type in order to bring the voltage up to a level needed, and a level of about 10,000 to 250,000 volts with low milliampere current flow will effect cooling depending on the capacity needed.

As can be appreciated, during the machining of metal, the cooling apparatus has no effect on the metal cuttings and they may drop by gravity from the cutting area. Care will need to be taken to prevent arcing between the probe and the cuttings as the cuttings are being removed from the workpiece. During the machining operation, where the tool is moving, the particular probe therefore would also be mounted for movement to maintain its position for cooling the tool.

The theory upon which the electrostatic discharge of the probes causes the rapid transfer of heat to the ambient atmosphere is not established, although it is believed that the discharge disrupts the boundary layer at the interface between a solid and the surrounding gaseous atmosphere to the extent that heat can be dissipated at a substantially fast rate.

Where flying metal chips would interfere with the electrostatic field and cause arcing, it would not be practical to cool the cutting tool electrostatically as shown in FIG. 1. However, by use of the well known heat pipe, together with electrostatic cooling, the cutting tool can be effectively cooled without regard to the cutting chips. Such a cooling arrangement is illustrated in FIG. 3 wherein a cutting tool 55 having a cutting tip 56 is provided with a blind bore extending from the support end to receive a heat pipe 57. A probe 58 is arranged adjacent the end of the heat pipe extending from the support end of the cutting tool. This arrangement operates in general by transmitting the heat from the cutting tip through the heat pipe 57 and into the ambient atmosphere. The heat pipe 57 may be of any suitable type such as including a closed metal vessel 59 defining a vacuum chamber 60 lined with a capillary structure or wick 61 which is saturated by a suitable volatile working fluid. Heat generated at the cutting tip 56 is absorbed by the adjacent end of the heat pipe and transported to the end exposed to the ambient atmosphere. Rapid transfer of heat from the exposed end of the heat pipe to the surrounding atmosphere is accomplished by the electrostatic field generated by the probe 58. The cutting tool and the heat pipe are grounded or connected to the positive side of the high voltage D.C. source, while the probe is connected to the negative side of the source. It can be appreciated the end of the heat pipe being enveloped in an electrostatic field by the probe 58 is remote from any metal chips at the cutting tip, wherein the chips cannot affect the field. Accordingly, the tool can be effectively cooled.

It will be understood that modifications and variations may be effected without departing from the scope of the novel concepts of the present invention, but it is understood that this application is to be limited only by the scope of the appended claims.

This invention is hereby claimed as follows:

1. The method of cooling a workpiece being machined on a machining apparatus, wherein the apparatus includes a workpiece holder mounted on said bed and insulated therefrom, and a tool holder having means for insulating a tool held thereby from the tool holder, the method including applying a high voltage low current direct current potential to the probe, grounding the workpiece and tool, and spacing the terminal end of the probe a distance from the workpiece slightly greater than that which would cause arcing between the probe and workpiece and in the area where the tool engages the workpiece.

2. The method as defined in claim 1, and the further steps of applying a high voltage low current direct current potential to a second probe, and spacing the terminal end of said second probe a distance from the cutting end of the workpiece slightly greater than that which would cause arcing between the probe and tool and in the area where the tool engages the workpiece.

3. The method as defined in claim 2, wherein the level of the potential is such as to dissipate heat generated in the cutting operation.

4. A machining apparatus comprising a bed, a tool holder mounted on the bed, a workpiece holder mounted on the bed, means electrically insulating a cutting tool held by the tool holder, means electrically insulating the workpiece holder from the bed, means grounding the tool and the workpiece holder, a source of high voltage direct current potential, a probe mounted adjacent the workpiece holder and connected to one side of the source, and the terminal end of the probe being spaced from a workpiece held by the workpiece holder a distance slightly greater than that which would cause arcing between the probe and workpiece and at the area of engagement between the tool and workpiece.

5. A machining apparatus as defined in claim 4, and a second probe amounted adjacent the tool holder and connected to one side of the source, and the terminal end of the probe being spaced from the tool a distance slightly greater than that which would cause arcing between the probe and tool and at the area of engagement between the tool and workpiece.

6. A machining apparatus as defined in claim 5, wherein the level of the potential is such as to dissipate heat generated in the cutting operation.

7. A machining apparatus comprising a bed, a tool holder mounted on the bed, a workpiece holder mounted on the bed, means electrically insulating a cutting tool held by the tool holder, means electrically insulating the workpiece holder from the bed, means grounding the tool and the workpiece holder, a source of high voltage direct current potential, a heat pipe mounted within the cutting tool or cutting tool holder and extending from adjacent the cutting tip and protruding from the end of the cutting tool or cutting tool holder opposite the cutting tip end, a probe mounted adjacent the protruding end of the heat pipe and connected to one side of the source, and the terminal end of the probe being spaced from the heat pipe a distance slightly greater than that which would cause arcing between the probe and heat pipe.

* * * * *